US012291755B2

(12) United States Patent
Žitný

(10) Patent No.: US 12,291,755 B2
(45) Date of Patent: May 6, 2025

(54) METHOD OF DISINTEGRATING AND FLUID DRYING OF SUGAR BEET MATERIAL PREVENTING THE DEGRADATION REACTION OF THE MATERIAL

(71) Applicant: Boris Žitný, Nitra (SK)

(72) Inventor: Boris Žitný, Nitra (SK)

(73) Assignee: Boris Zitny, Nitra (SK)

( * ) Notice: Subject to any disclaimer, the term of this patent is extended or adjusted under 35 U.S.C. 154(b) by 453 days.

(21) Appl. No.: 17/905,602

(22) PCT Filed: Sep. 2, 2020

(86) PCT No.: PCT/SK2020/050015
§ 371 (c)(1),
(2) Date: Sep. 2, 2022

(87) PCT Pub. No.: WO2021/177902
PCT Pub. Date: Sep. 10, 2021

(65) Prior Publication Data

US 2023/0125980 A1 Apr. 27, 2023

(30) Foreign Application Priority Data

Mar. 4, 2020 (SK) ................................ 50012-2020

(51) Int. Cl.
*C13B 5/00* (2011.01)
*C13B 5/06* (2011.01)
*C13B 10/02* (2011.01)

(52) U.S. Cl.
CPC .............. *C13B 5/06* (2013.01); *C13B 10/025* (2013.01)

(58) Field of Classification Search
None
See application file for complete search history.

(56) References Cited

U.S. PATENT DOCUMENTS

2018/0360081 A1 12/2018 Brown

FOREIGN PATENT DOCUMENTS

| | | | | |
|---|---|---|---|---|
| FR | 2928817 | A1 | | 9/2009 |
| GB | 2287636 | A | | 9/1995 |
| GB | 2287952 | A | | 10/1995 |
| RU | 2503379 | C1 | | 1/2014 |
| SK | 501162014 | | * | 1/2015 |

OTHER PUBLICATIONS

SK501162014. English translation (Year: 2014).*
International Search Report and Written Opinion of the International Searching Authority; Application No. PCT/SK2020/050015; Completed: Dec. 10, 2020; Mailing Date: Jan. 13, 2021; 10 Pages.
Notification Concerning Submission, Obtention or Transmittal of Priority Document; Application No. PCT/SK2020/050015; Issued: Oct. 15, 2020; 1 Page.
International Preliminary Report on Patentability; Application No. PCT/SK2020/050015 ; Issued: Sep. 6, 2022: 6 Pages.

* cited by examiner

*Primary Examiner* — Stefanie J Cohen
(74) *Attorney, Agent, or Firm* — Husch Blackwell LLP

(57) ABSTRACT

A method for the disintegration and fluid drying of sugar beet material which prevents the material's degradation reaction from taking place and which includes the steps of disintegrating the sugar beet material to particles with a particle surface area of at least 2.0 $cm^2$, and subsequent immediate exposure of the disintegrated material to a drying gas(es) at a temperature of 25° C. to 160° C. and a flow rate of 5 $m \cdot s^{31\ 1}$ to 40 $m \cdot s^{-1}$, where the relative humidity of the drying gas(es) at the inlet to the drying space is at most 85%; and subsequent mixing of the disintegrated material with a flow of drying gas(es) until attaining a value of dry matter of at least 70% by weight.

19 Claims, No Drawings

METHOD OF DISINTEGRATING AND FLUID DRYING OF SUGAR BEET MATERIAL PREVENTING THE DEGRADATION REACTION OF THE MATERIAL

TECHNICAL FIELD

The present teaching is related to a method of disintegrating and fluid drying of sugar beet material that prevents the degradation reaction of the material.

BACKGROUND

After disrupting the tissues, the sugar beet material degrades rapidly and loses its quality. In order to maintain the quality of the sugar beet material for further processing in the food industry, the rapid cessation of the degradation processes—the stabilisation of sugar beet material—is of key importance.

A number of methods of stabilising sugar beet material are known, using energy transfer by means of steam or liquid, also by means of radiant heating at temperatures above 150° C., with a preceding step of chemical stabilisation, or using microwave radiation.

Other drying methods described in the state of the art that partially or completely prevented degradation were evaporation under reduced pressure, or conventional drying, e.g. in the oven. In some cases, chemical reducing agents or antioxidants were used to prevent the degradation of the material, acting as a temporary protection against oxidation of the material, meaning that, as was the case of the method of heating up the material, they prevent an enzymatically catalysed reaction with atmospheric oxygen, but chemically.

These methods were always focused only on the destruction of polyphenol oxidases, which are thermolabile and its thermal inactivation occurs at temperatures above 80° C. This limits degradation by atmospheric oxygen.

In the document GB9405888A, sugar beet roots were cut into particles which, immediately after cutting, were blanched in water above 87° C. or exposed to live steam and subsequently dried in hot air in the fluid bed drier at temperatures exceeding 100° C. until the dry matter in the material exceeded 90% by weight. The dried material was ground into particles where 90% of particles were smaller than 425 μm; this material could still be mixed with vegetable oil to prevent hardening.

Patent RU2503379C1 describes the preparation of a mixture for the preparation of beverages where sugar beet roots are cut into particles of roughly 3.0 mm in size, fluidly dried and roasted at a temperature of 120° C. to 130° C. and subsequently ground to a powder which is mixed with ground mass of seeds of milk thistle (*Silybum marianum*) and such product is suitable for the preparation of beverages. The disadvantage is that during drying the material browns and partially or completely degrades.

As is clear from the state of the art, fluid drying is used only for final drying of the already stabilised sugar beet material, or for the production of sugar beet products in which the degradation of quality is not an obstacle to their use (e.g. fodder). The methods of fluid drying of unstabilised (fresh) sugar beet material as described in the state of the art would cause its degradation.

SUMMARY

The object of the present teaching is a method for drying sugar beet material which is also suitable for an unstabilised (fresh) material, i.e. a material in which the degradation reactions have not yet been stopped (colour change and deterioration of aroma and taste) without their degrading during drying. The present teaching describes a drying process which stops degradation reactions in an unstabilised material without the application of wet processes.

The method according to this present teaching is based on regulating the release of water from sugar beet tissues so that the free water released from the tissues during the disintegration of sugar beet roots can be removed in a sufficiently short time interval, shorter than the time required for the full course of degradation reactions to an extent that harms the quality of the material. Sufficiently fast removal of free water must be achieved in surfaces where tissues are disrupted in the material by converting water into water vapour. This mechanism prevents the degradation reactions taking place in the contact of the material with atmospheric oxygen or electromagnetic radiation. The drying method according to the present teaching takes advantage of the knowledge that the degradation reactions take place only in a reaction environment where a sufficient amount of liquid water is present. The method according to the present teaching thus prevents the degradation of the sugar beet material, taking place as a natural process after disrupting the tissues of the sugar beet roots.

Under the present teaching, material's degradation means the processes and reactions that take place in the tissues of the sugar beet root and its varieties almost immediately after tissue disruption, and the external sign of degradation being a change in colour of the sugar beet material from grey to black hues and increase in the concentration of oxidation products. Degradation also means a reduction in the concentration of nutritionally important substances, especially amino acids and total polyphenols, but also the intensification of already existing negative tastes and aromas in the material, which significantly reduces its sensory and nutritional quality.

The speed at which the degradation reactions after disrupting the integrity of sugar beet tissues take place varies depending on the soil and climatic conditions during plants' growth, as well as the time of their harvest and the method and length of their storage (processing date). Differences were also observed among varieties.

Under the presented teaching, the material means the whole sugar beet roots or parts thereof. Material also means particles or cuttings of sugar beet after extraction with water, which are created as a by-product in the sugar industry during the step of diffusion of sugar juices in sugar refineries.

Under the present teaching, an unstabilised material means to be a material that was not, before drying, exposed to a temperature of 85° C. or higher, or radiation, or chemicals, or any other effect which alone or in combination causes complete or partial inactivation of enzymes present in the material.

Free water means water released from sugar beet cells after disruption of its tissues. By rapidly removing free water from the material, the substances entering the degradation reactions are immobilized on the tissues before the reactions and before more significant degradation of the material take place, thus preventing the degradation reactions from occurring and not decrease the food quality of the material. By a decrease in the moisture content in the material of sugar beet below 30% by weight, the material degradation is significantly retarded. However, complete stabilisation of the material occurs only when the moisture in the material drops below 20% by weight, preferably below 18%.

We have found that the cessation of degradation reactions in sugar beet material by fluid, dry heat, is possible, but only if a sufficient quantity of energy per unit area is supplied to the material, in a sufficiently short time.

The method of disintegration and fluid drying of the sugar beet material according to the present teaching, that prevents the degradation of the unstabilised material comprises the steps:

disintegration of the sugar beet material into particles where the surface area of the particle is at least 2.0 $cm^2$, immediate exposure of the disintegrated material to a flow of drying gas/gases at a temperature of 25° C. to 160° C. and at a flow rate of 5 $m \cdot s^{-1}$ to 40 $m \cdot s^{-1}$, where the relative humidity of the drying gas at the inlet to the drying space is at most 85% and subsequent mixing of the flow of drying gas/gases with the disintegrated material until a dry matter value of at least 70% by weight, preferably 80%-99% by weight, is attained, though even more preferably at least 85% by weight, and most preferably 95% by weight or more.

In order to ensure a sufficiently rapid drying of the sugar beet material that prevents its degradation, it is necessary to ensure that only such an amount of water is released from the tissues during disintegration that can be evaporated quickly enough by fluid drying before degradation reactions are initiated in the material.

Thus, the particle size of the material formed during disintegration regulates the amount of free water released in the material from the disrupted tissues after disintegration.

The total water content in sugar beet roots and thereby also in the material varies depending on the growing conditions, location, method and length of storage, as well as the time of harvest. With the increasing moisture content of the material, it is advantageous to increase the particle size of the disintegration. The usual value of moisture of the material ranges from 72% by weight up to 79% by weight. Prior to drying, it is necessary to disintegrate the sugar beet roots into particles of a specific size; it is beneficial to take into account their moisture when disintegrating the roots, and select the particle size during disintegration depending on the input moisture. The disintegration parameters given in the present teaching are based on a moisture content of the material of 75% by weight; with the increasing moisture of the material it is advantageous to increase the surface area of particles by at least 5% to 10% for each percentage of exceeded moisture. The same principle applies in the opposite case, where it is possible in the same way to reduce the surface area of the particles in the disintegration step with a decrease in the moisture content of the material.

It is advantageous that a particle shape with the smallest possible surface area be selected during disintegration, but any particle shape that meets the surface size requirements is satisfactory.

In order to eliminate the degradation reactions in the fluid drying process according to this present teaching, the sugar beet material must be disintegrated into particles with a surface area of at least 2.0 $cm^2$ or more, preferably at least: 2,2 $cm^2$, 2,5 $cm^2$, 2,8 $cm^2$, 3,0 $cm^2$, 3,2 $cm^2$, 3,5 $cm^2$, 3,8 $cm^2$, 4,0 $cm^2$, 4,5 $cm^2$, 5,0 $cm^2$, 5,5 $cm^2$, 6,0 $cm^2$, more preferably 8.0 $cm^2$ or more, most preferably 10 $cm^2$ or more. At the same time it is advantageous if the smallest size of the particle is at least: 0.5 mm, 0.8 mm, 1.0 mm, 1.2 mm, 1.5 mm, 1.8 mm, 2.0 mm, 2.2 mm, 2.5 mm, 3.0 mm or 4.0 mm. Due to the shape of the roots, the material may also contain particles which, when disintegrated, are smaller than 2.0 $cm^2$; these are fractures, imperfect or non-standard particles, especially due to shortcomings in the technical solution of the disintegration equipment. Likewise, a circular shape of the sugar beet roots presupposes different particle dimensions, in particular in the direction of one of the root cutting axes during disintegration, due to the geometry of cutting, and/or grating and/or the disintegration method of a sugar beet root.

During the disintegration process into smaller particles, the proportion of free water in the material would be too high, and its removal would take longer than the initiation and course of degradation reactions, and the material would degrade, despite the compliance with other drying conditions.

Therefore, it is also important that the material be dried immediately after disintegration of the sugar beet material.

The temperature of the drying gas must be in the range of 25° C. to 160° C., preferably 35° C. to 160° C., even more preferably 45° C. to 119° C., even more preferably 85° C. to 119° C., most preferably 90° C. to 110° C.

When drying with drying gas at drying temperatures above 100° C. and humidity content of the material below 30% by weight, the material may begin to caramelise, which is beneficial in some cases of use of the end products, and not in others.

The degradation of the material takes place most intensively in the temperature range from 65° C. to 85° C. Damage to the cell membranes of the material's tissues during drying at temperatures exceeding 70° C. causes a gradual partial course of degradation reactions also inside the material during slow drying. Therefore, it is preferable to dry the material at temperatures of 25° C. to 65° C., at an inlet drying gas velocity of 12.0 $m \cdot s^{-1}$ to 20 $m \cdot s^{-1}$, more preferably at 45° C. to 65° C., at an inlet drying gas velocity from 8.0 $m \cdot s^{-1}$ to 14 $m \cdot s^{-1}$, subject to maintaining the other conditions of the present teaching. However, drying at low temperatures prolongs the drying time.

From the aspect of drying speed, it is advantageous to dry the material at a temperature of 90° C. to 119° C. and at a drying gas velocity of at least 5.0 $m \cdot s^{-1}$, when there is no damage to the material by degradation due to the influence of the quick heating of the material, despite the damage to the cell membranes of tissues in the material.

During the drying process, it is necessary to ensure fast drying of the material's surface while at the same time it is necessary to ensure that the drying gas flow reaches the largest area possible of each particle of the dried material, at least 50% of the total particle's area, preferably at least 75% of the total particle's area, most preferably the entire area of the particle. The most beneficial solution is, if during the drying process the material is being intensively mixed with the drying gas, at least until the moment when the moisture content of the material drops below 30% by weight. In order to ensure the largest area possible that comes into contact with the gas flow during the mixing of the material and the flowing drying gas, it is important that no agglomerates of material's particles be formed in the drying space into which the drying gas would be unable to penetrate. Particle agglomerate under this present teaching means a group of particles which adhere to each other by a part of their surface area and even when moving freely due to mechanical forces developed in the dryer or by drying gas, the adhered surface areas do not separate, and a set of particles in agglomerate creates one aggregated particle which when put in motion behaves as one piece (as a single particle). For proper drying under this present teaching, it is beneficial to ensure that the particle agglomeration size is at most 100 mm, more preferably at most 80 mm, even more preferably 60 mm, most preferably 35 mm or less and the time of existence of any larger particle agglomeration in the drying space is at most 5 minutes, preferably less than 2 minutes, until the moisture content falls below 50% by weight, while maintaining the other drying conditions.

If the flowing gas does not penetrate the particle agglomerate, the free water remains entrapped in the centre of the particle agglomerate in liquid form and is not removed fast enough to prevent degradation reactions from taking place. In the part of the material where moisture is not removed from the material, partial degradation may occur after contact with gaseous oxygen. The penetration of gas and its contact with the material is ensured mainly by the movement of particles and/or gas in the drying space providing the flow of drying gas at a sufficient flow rate, with the limitation of relative humidity of drying gas (regulation of relative humidity of drying gas) and at the same time the shape and size of dried particles created in the step of disintegrating sugar beet roots. The shape and size of the particles during disintegration can be influenced by methods known from the state of the art, e.g. the size of the cutting gap between the blades of the cutting knives and their geometry of the arrangement in space.

The drying method according to the present teaching is carried out in fluid bed dryers, where a fluid bed dryer under this present teaching means any device whose purpose is to dry the material in a gas flow and where contact of the material with the gas flow is ensured so that the particles are put into motion by one of the structural parts of the dryer, and/or by a gas flow.

The preferred solution is drying in drum dryers where the material is put into motion by mechanical mixing and/or movement of the inner shell of the dryer. Belt dryers are also suitable where the material is layered with the drying gas coming into contact with it, preferably in such a way in which the drying gas is blown through such layer (extruded). A layer means the placement of particles in a space where the particles forming the layer physically touch each other with their surface area, i.e. they are in direct contact with adjacent particles. The layer of loosely poured particles of material on the surface of the conveyor belt or grate is at most 100 mm deep, preferably at most up to 60 mm, even more preferably up to 50 mm and most preferably up to 35 mm. Particles of the material in the fly-up are not considered to be a layer for the purposes of the present teaching. A particle is in fly-up if the applied force acting by the flow of drying gas hitting the surface area of the particle is greater than the force of gravity acting on the particle, where the resultant force vector of these forces does not act in the same direction. Other construction types of dryers meeting the conditions of this drying method can also be used for drying the material.

The flow rate of the drying gas in the drying space must be 5.0 $m \cdot s^{-1}$ to 40 $m \cdot s^{-1}$, possibly even higher, preferably 5.5 $m \cdot s^{-1}$ to 25 $m \cdot s^{-1}$, even more preferably 6.0 $m \cdot s^{-1}$ to 20 $m \cdot s^{-1}$, and most preferably 6.5 $m \cdot s^{-1}$ to 15 $m \cdot s^{-1}$.

The relative humidity of the drying gas at the inlet to the drying space must be as low as possible, though not more than 85%. It is preferable that the relative humidity of the drying gas at the inlet to the drying space is as low as possible, preferably from 0% to 80%, more preferably up to 75%, even more preferably up to 70%, most preferably from 0% to 60%, or from 0% to 50%.

It is preferred that the relative humidity of the drying gas which contains more than 4% of oxygen be less than 30%, more preferably less than 20%, even more preferably less than 15% and most preferably less than 10%.

In terms of implementation, the drying of the drying gas is expensive, therefore from the economic point of view it is advantageous to use the relative humidity of the drying gas in the range from 80% to 20%, even more preferably from 60% to 30%, most preferably from 55% to 5%.

The flow rate of the drying gas at a given temperature and humidity are key parameters, since only with the air flow rate at a given humidity and temperature is maintained is liquid water removed from the surface area of the particles at a sufficiently quick rate to prevent degradation.

According to the preferable implementation, the disintegrated material is first dried with a drying gas with a higher temperature above 100° C. and a flow rate of 5.0 to 7.0 $m \cdot s^{-1}$ for a period of 10 to 30 minutes and then the drying gas temperature is decreased proportionally with decreasing water content in the material down to a temperature value of 90° C., or down to 25° C., with a moisture content below 30% by weight in dried material. This procedure ensures faster and more efficient drying of the material.

The process of drying the material can take place at drying gas temperatures within the above listed ranges so that the temperature of the drying gas and/or the relative humidity of the drying gas at the inlet to the drying space varies during the process at arbitrary time intervals depending on the moisture of the material.

According to another preferable implementation, the disintegrated material is dried with a drying gas at a rate of 7.5 $m \cdot s^{-1}$ to 9.5 $m \cdot s^{-1}$ and a temperature of 25° C. to 55° C. until reaching the moisture content below 30% by weight in the dried material. In this way, the energy costs for drying are minimised.

Preferably, the drying process takes place at a flow rate of drying gas in the drying space that is inversely proportional to its temperature at inlet, where at a temperature of 25° C. the drying gas flows at a minimum rate of 12.0 $m \cdot s^{-1}$, preferably above 15 $m \cdot s^{-1}$, and at a temperature of 90° C. to 160° C. the drying gas flows and a minimum rate of 5.0 $m \cdot s^{-1}$, where the relative humidity of the drying gas from the start of drying is at most 75% by weight. Where the drying gas is air or gas with oxygen content of 4% or more, then the relative humidity of the drying gas at the inlet to the drying space is 0% to 30%, preferably below 20%, more preferably below 10%.

The resultant dried material is, in a dry state with a moisture content below 20% by weight, stable against degradation. The dried material is of white-yellow to light beige colour with a slight shade of light green, at higher drying temperatures, above 100° C., it is usually a darker brownish colour.

The drying gas can be atmospheric air, oxygen-depleted air, nitrogen, carbon dioxide, or another atmospheric gas, or a mixture of two or more gases in different proportions. Preferably, the drying gas is a mixture of nitrogen and carbon dioxide in a ratio of 1:10 to 10:1.

When the drying gas is air, it is preferred that its temperature is in the range of 25° C. to 140° C., preferably 25° C. to 70° C., more preferably 95° C. to 115° C.

Oxidation by atmospheric oxygen is a known initiation factor triggering the degradation of unstabilised material. Therefore, it is beneficial to implement the process under the present teaching in an oxygen reduced environment. It is beneficial, if the oxygen content in the drying space or even in the disintegration step is reduced by at least 40% compared to the oxygen concentration in the Earth's atmosphere, preferably by 60% and most preferably by 80% or more.

We found that by reducing the oxygen concentration in the drying space to at most 12% by weight the degradation reactions are significantly slowed, disproportionately to the reduction of oxygen concentration.

According to the preferable implementation, the process according to the present teaching takes place in a controlled atmosphere of gases, where the oxygen content is at most 12% by volume, preferably 4% by volume, most preferably 0% by volume. Alternatively, such a controlled atmosphere is only within the space of the dryer room.

Most preferably, a gas mixture with a majority of carbon dioxide is used. Carbon dioxide significantly reduces the sensitivity of the material to degradation by atmospheric oxygen, as carbon dioxide is soluble in water and during its use it is absorbed by the particles' surface and pH in free fluid of the material is reduced, slowing down part of the degradation reactions. Carbon dioxide is also a heavier gas than oxygen, and thus displaces gaseous oxygen from the drying space.

We have also found that initiation or acceleration of the course of degradation reactions in material involves, in addition to oxygen, also radiation of a certain wavelength spectrum. Namely, this is solar radiation with a wavelength of 200 nm to 1100 nm, in particular radiation with a wavelength of 200 nm to 420 nm and also radiation with a wavelength of 550 nm to 650 nm. Radiation of this wavelength is partially absorbed by the material and is used as activation energy to initiate and accelerate degradation changes.

Degradation reactions take place in a more intensive manner if the material is exposed to radiation in the spectrum of 200 to 420 nm, and during the course of the reaction the degradation reactions begin to intensify with the change of colour of the material also due to the effect of radiation with wavelengths from 550 nm to 650 nm or even at wider wavelengths from 200 to 1100 nm.

Therefore, it is beneficial to carry out the method under the present teaching in an environment where the radiation intensity in the spectrum from 200 to 420 nm is at most 0.010 mW $cm^{-2}$, preferably below 0.005 mW $cm^{-2}$, and the amount of energy emitted in the said spectrum in contact with the material up until the moment of its humidity decreasing below 30% by weight is at most up to 300 $mJ.cm^{-2}$, more preferably up to 150 $mJ.cm^{-2}$ and most preferably up to 50 $mJ.cm^{-2}$ in contact with the material.

It is also beneficial to carry out the method under the present teaching in an environment where the radiation intensity in the spectrum from 200 to 420 nm and from 550 nm to 650 nm is at most 0.015 mW $cm^{-2}$ and the amount of energy emitted in the said spectrum in contact with the material up until the moment of its humidity decreasing below 30% by weight is at most up to 400 $mJ.cm^{-2}$, more preferably up to 300 $mJ.cm^{-2}$ and most preferably up to 150 $mJ.cm^{-2}$ in contact with the material.

It is likewise beneficial to carry out the method under the present teaching in an environment where the radiation intensity of the above wavelengths from 200 to 1100 nm is at most up to 0.040 mW $cm^{-2}$, preferably up to 0.015 mW $cm^{-2}$ or where the radiation energy with the said wavelength does not exceed 600 $mJ.cm^{-2}$, preferably up to 300 $mJ.cm^{-2}$, even more preferably up to 150 $mJ.cm^{-2}$ in contact with the material.

Furthermore, we found out that in the absence of light radiation of the above listed wavelengths, the intensity of material's degradation is lower only due to the effect of oxygen—beyond the framework of simple deducting the intensity of radiation-based degradation.

However, the most advantageous solution with the highest product quality remains the implementation of the entire method under the present teaching in an environment with a reduced oxygen content to at most 12% and at the same time in an environment with reduced radiation intensity of the respective wavelengths, as mentioned above. Alternatively, these conditions should be ensured only in the environment of the drying room.

According to another preferable implementation, the method under the present teaching can be repeated several times in succession. In the first stage the material is disintegrated into larger particles, where the average surface area of the particle is in the range from 20 $cm^2$ to 600 $cm^2$, whereby no single particle dimension after the first disintegration is less than 3 mm. This disintegrated material is dried according to the method of the present teaching until the liquid water has completely evaporated from the surface of the particle. Subsequently, in the second stage the particles are repeatedly disintegrated so that the total average surface area of particles of the material after disintegration is increased by at least 5% to 1000%, preferably by 50% to 500% compared to the original total average particle surface area from the first disintegration (where the area of the individual particle in each stage of disintegration always decreases). This disintegrated mass is dried again as in the first stage. This process is repeated until the total dry matter content of the material reaches at least 70% by weight, preferably 80% by weight or more.

The material with dry matter content of at least 70% by weight, preferably 80% by weight or more, is considered to be a dried material under the present teaching and may also be disintegrated into particles with a surface area of less than 2.0 $cm^2$. The moisture content in such material can be further reduced by any drying method.

Disintegration following the drying of a once disintegrated material that is followed by repeated drying, is referred to in the context of the present teaching as a single drying cycle. The number of drying cycles is not limited. It is preferable to do a range of 1 to 20 cycles.

The complete evaporation of liquid water from the surface of the particle can be tested by placing the particle on cellulose filter paper. In this case the particle should not wet the filter paper when touched loosely.

The present teaching describes a method of fluid drying of sugar beet material which prevents or significantly reduces the degradation of the sugar beet material without changing the colour of the material to shades of dark grey to black as is characteristic of drying fresh unstabilised material of sugar beet. This drying method is also suitable for an unstabilised sugar beet material, i.e. material in which the degradation reactions have not yet been stopped by methods known from the state of the art.

The presented method of fluid drying stabilising the material and ceasing the degradation reactions in the unstabilised material is beneficial for use in the production of sugar beet products where their light colour, natural taste and aroma are of importance for their placement on the market, especially in the production of sugar beet products used as food or food ingredients.

An advantage of this method is to reduce the degradation of material's quality and at the same time to limit wet processes in sugar beet processing technology, also prevention of sugar beet spoilage during storage without quality degradation, as well as reduction of costs in the production of sugar beet food or products, especially in the methods of producing food materials where the degradation of the material impairs the quality of the products and where in any of the processing steps the presence of water in the material is a less desired solution.

EXAMPLES OF EMBODIMENTS

Example 1

Sugar beet roots with a moisture content of 78% by weight were grated into particles with a cross-section dimension of approximately 4×3 mm and a length of 40 to 120 mm, the particles of this size formed approximately 85%-90% of the obtained material. The temperature of the material was about 20° C., immediately after grating on an industrial grater the material was transferred to a quarter-operation drum dryer and dried for a maximum of 5 minutes in an air flow with a flow rate of 8.5 $ms^{-1}$±0.5 $ms^{-1}$ at a temperature of 90° C.±5° C. throughout the process. The air flow in the dryer during the process was from 1750 $m^3$/h to 1900 $m^3$/h. The material was dried in a drum dryer with the inner shell of the drum dryer rotating perpendicularly to the direction of drying air flow at a speed of 65 rpm and thus rotating the material during a drying time of 120 minutes. Following the expiry of this drying time, the dry matter content in the material reached a level of 9%±2% by weight. The material after drying was beige-yellow to light green in colour, with no signs of degradation. The particles, which contained the tissues of the outer skin of the sugar beet roots, the epidermis, were, at the place of the epidermis, darker and locally coloured in brown shades with occasional dark spots below the epidermis, which, however, did not generally damage the quality of the material. After drying, the material was stable in atmospheric air also during its storage. The flavour and aroma of the material was typical for sugar beet.

Example 2

Identically with Example 1, the sugar beet material was disintegrated and dried in the same method, but in the space for disintegrating the sugar beet roots as well as throughout the drying process the electromagnetic radiation of wavelengths from 200 nm to 420 nm was reduced to 0.003 $mW.cm^{-2}$ and to 50 $mJ.cm^{-2}$. The material was found to be less prone to discolouration and the degradation reactions slowed compared to the processes when the material was dried in Example 1. The effects of radiation reduction were significantly more noticeable when drying temperature was reduced to 55° C. and the drying time was extended from 120 minutes to 300 minutes.

After the expiry of the drying time, the final moisture content of the material reached a level of 16%±2% by weight. The material was lighter in colour with no black or grey spots apparent in the epidermis as in Example 1. Other features of the dried materiel were similar to Example 1. In a repeated experiment, the material was dried in a flow of nitrogen and carbon dioxide under the same conditions but at a gas flow rate of 5 $ms^{-1}$, where the oxygen content was measured by a probe at the outlet of the device and during drying did not exceed 6% by volume in the gas mixture. In the atmosphere of gases, the material was dried with the same result, with no visible degradation, but the resulting colour was lighter and the aroma of the material was assessed as less marked by typical sugar beet odours.

Example 3

The sugar beet was disintegrated on cutting knives into particles with a cross-section of approximately 3×8 mm and a length of 50 to 100 mm, which formed at least 80% by weight of disintegrated material. The material prepared in this manner was dried in a cabinet tray dryer at an air flow rate of 8.0 $m{\cdot}s^{-1}$ where the tray was made of stainless steel mesh. The material was layered on the trays to a maximum height of 40 mm so that it was loosely poured onto the tray so that the layer be passable for the drying air flow during drying. The material layered in this manner was dried at 65° C. for 5 hours to give the resultant 14% by weight of humidity; the resulting quality of the material was similar to the quality of material obtained in Example 1, but the drying rate was lower in this method. In a repeated experiment, the material after disintegration was cut with a knife calibre of 3×4 mm (cross section) with a length of particles (slices) of up to 70 mm. The material disintegrated in this manner was dried in a flow of air at a flow rate of 9 to 10 $m{\cdot}s^{-1}$ at a temperature of 40° C. for about 280 minutes to a humidity value of 14%±2%. The material was of light green colour without any marks of damage by degradation (without colour changes towards black hues). The flavour and aroma of the material was typical for sugar beet.

Example 4

The sugar beet was disintegrated into particles with a cross section of 15×8 mm and a length of up to 120 mm, which were dried in a flow of air at a temperature of 35° C. with a flow rate of 15.0 $m{\cdot}s^{-1}$, after 30 minutes the material still contained about 60% by weight of moisture, but the surface of the material was dried and when placed on cellulose filter paper, the particles did not leave a wet surface on the paper. Subsequently, the material was repeatedly disintegrated by grating on a disc grater where more than 75% of particles gained cross-sectional dimensions of approximately 15×8 mm and the length of slices up to 30 mm. The material disintegrated for the second time in this manner was dried fora further 120 minutes, whereby the humidity dropped by about 22% by weight. Subsequently, the material was disintegrated again into particles measuring approximately 10×8×10 mm, and the air temperature was set at 50° C., at which the material was fully dried to the resultant dry matter content of 92% by weight. During the whole process, electromagnetic radiation with wavelengths of 200 nm to 420 nm was reduced so that the radiation energy during drying did not exceed 100 $mJ.cm^{-2}$. The material dried in this manner had a lighter colour than the material in Example 1, had a lighter yellow-green colour and a typical aroma of sugar beet, without colour changes to shades of dark or black.

Example 5

As in Example 4, the sugar beet was fluid dried, but the roots were only quartered and air dried at 25° C. with a flow rate of 12.0 $ms^{-1}$ for 30 minutes, after which parts of the roots were cut into parts with an average surface area of particles of about 40 $cm^2$ and further dried for 30 minutes. By repeated cutting of the particles after drying their surface, their average surface area shrank to about 10 to 15 $cm^2$, during 60 minutes of drying under unchanged process conditions. Subsequently, the temperature of the drying air was raised to 60° C., the air flow was reduced to 8.0 $m{\cdot}s^{-1}$, and the material was dried for a further roughly 80 minutes, when the dry matter content reached was about 74% by weight. In the last step, the material, cut on knives with a cutting cross-section of 3×3 mm to particles with a surface area of 2.5 $cm^2$ to 8 $cm^2$, was dried at 68° C. and an air flow rate of 8.0 to 9.0 $m{\cdot}s^{-1}$ to a dry matter value below 80% by weight. The material had comparable qualities without a sign of degradation as was the case of material in Example 4. Throughout the process the radiation intensity in the space was below 0.005 $mW.cm^{-2}$.

The invention claimed is:

1. A method of disintegration and fluid drying of the sugar beet material preventing the degradation reaction from taking place, comprising:

disintegration of the sugar beet material into particles where the surface area of the particle is at least 2.0 $cm^2$, immediate exposure of the disintegrated material to a flow of drying gas(es) at a temperature of 25° C. to 160° C. and at a flow rate of 5 $m \cdot s^{-1}$ to 40 $m \cdot s^{-1}$, where the relative humidity of the drying gas(es) at an inlet to a drying space in a fluid dryer is at most 85% and were the drying takes place until a dry matter value of at least 70% by weight has been attained.

2. The method according to claim 1, wherein the material is disintegrated into particles, where the smallest dimension of particle is at minimum 0.5 mm.

3. The method according to claim 1 wherein the temperature of the drying gas flow is 45° C. to 119° C.

4. The method according to claim 1, wherein the flow rate of the drying gas is 5.5 $m \cdot s^{-1}$ to 25 $m \cdot s^{-1}$.

5. The method according to claim 1, wherein the relative humidity of the drying gas is 0% to 80%.

6. The method according to claim 1, wherein the mixing of the material with the drying gas flow takes place until attaining a value of dry matter of at least 85% by weight.

7. The method according to claim 1, wherein the drying gas is selected from a group consisting of: air, air with reduced oxygen content to at most 12% by volume, nitrogen, a mixture of nitrogen and carbon dioxide, carbon dioxide.

8. The method according to claim 7, wherein the drying gas is a mixture of nitrogen and carbon dioxide in a ratio of 10:1 to 1:10.

9. The method according to claim 1, wherein the drying gas is air at a temperature of 25° C. to 140° C.

10. The method according to claim 1, wherein the flow rate of the drying gas in the drying space is inversely proportional to its temperature at inlet, and where the drying gas at a temperature of 25° C. flows at a minimum speed of 12 $m \cdot s^{-1}$, and where the relative humidity of the drying gas at the beginning of the drying is at most 75% by weight.

11. The method according to claim 1, wherein it takes place in an environment in which the radiation intensity with a wavelength of 200 nm to 420 nm is at most 0.010 mW $cm^{-2}$, and/or the amount of energy emitted in the listed spectrum is at most below 300 mJ $cm^{-2}$.

12. The method according to claim 1, wherein it takes place in an environment in which the radiation intensity with a wavelength of 200 nm to 1100 nm is at maximum 0.040 mW $cm^{-2}$, and the amount of energy emitted in the state spectrum is at most below 600 mJ $cm^{-2}$.

13. The method according to claim 1, wherein the drying takes place in a controlled gas atmosphere, where the oxygen content is at maximum 12% by volume.

14. The method according to claim 1, wherein the disintegrated material is first dried with a drying gas at a temperature above 100° C. for a period of 10 to 30 minutes, with the drying gas temperature being subsequently decreased proportionally with the decrease of the water content in the material down to 90° C., when a moisture content below 30% by weight in dried material is achieved.

15. The method according to claim 1, wherein the disintegrated material is dried with a drying gas at a speed of 7.5 $m \cdot s^{-1}$ to 9.5 $m \cdot s^{-1}$ and a temperature of 25° C. to 55° C. until attaining a moisture content below 30% by weight in dried material.

16. The method according to claim 1, wherein the method is repeated successively in the process 1 to 20 times, with the particle size of the mass being reduced each time.

17. The method according to claim 16, wherein the material is in a first stage disintegrated to particles with an average surface area of a particle being in the range of 20 $cm^2$ to 600 $cm^2$, and then the material disintegrated in this manner is dried until the liquid water has been fully evaporated from the particle's surface area, and subsequently the particles are repeatedly disintegrated so that the total average surface area of the material is increased by at least 5% to 1000% against the original average particle area of the material from the first stage where the area of individual particle in each degree of disintegration is always reduced; the material disintegrated in these manner is repeatedly dried in the same way as in the first stage and this process is repeated until the total content of dry matter in the material reaches at least 70% by weight.

18. The method according to claim 1, wherein the temperature of the drying gas flow is 90° C. to 110° C.

19. The method according to claim 1, wherein the flow rate of the drying gas is 6.5 $m \cdot s^{-1}$ to up to 15 $m \cdot s^{-1}$.

* * * * *